(12) United States Patent
Bai

(10) Patent No.: US 10,897,704 B2
(45) Date of Patent: Jan. 19, 2021

(54) METHOD OF CONNECTING A TERMINAL DEVICE TO NETWORK, A TERMINAL DEVICE AND A NON-TRANSITORY COMPUTER READABLE STORAGE MEDIUM

(71) Applicant: SHENZHEN UCLOUDLINK NEW TECHNOLOGY CO., LTD., Shenzhen (CN)

(72) Inventor: Enpeng Bai, Shenzhen (CN)

(73) Assignee: SHENZHEN UCLOUDLINK NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/889,805

(22) Filed: Jun. 2, 2020

(65) Prior Publication Data
US 2020/0344597 A1    Oct. 29, 2020

Related U.S. Application Data

(63) Continuation-in-part of application No. PCT/CN2019/078669, filed on Mar. 19, 2019.

(30) Foreign Application Priority Data

May 11, 2018  (CN) .......................... 2018 1 0448291

(51) Int. Cl.
*H04W 8/26* (2009.01)
*H04W 8/20* (2009.01)
*H04W 8/24* (2009.01)
*H04W 8/18* (2009.01)

(52) U.S. Cl.
CPC ............ *H04W 8/265* (2013.01); *H04W 8/183* (2013.01); *H04W 8/205* (2013.01); *H04W 8/24* (2013.01)

(58) Field of Classification Search
CPC ....... H04W 8/265; H04W 8/183; H04W 8/24; H04W 8/205; H04W 12/0023; H04W 12/003; H04W 12/004; H04W 12/00403
See application file for complete search history.

(56) References Cited

U.S. PATENT DOCUMENTS

| 2012/0196569 A1* | 8/2012 | Holtmanns | H04W 12/04 455/411 |
| 2015/0017950 A1* | 1/2015 | Zhao | H04W 8/20 455/411 |
| 2015/0245195 A1* | 8/2015 | Zhao | H04W 12/06 455/418 |

* cited by examiner

*Primary Examiner* — Marisol Figueroa
(74) *Attorney, Agent, or Firm* — Robert L. Steams; Dickinson Wright PLLC

(57) ABSTRACT

The present disclosure provides a network connection method, including: establishing a first mobile network through one activation soft SIM card in at least one activation soft SIM card previously arranged in a first terminal device in response to receiving a network connection request; transmitting a seed soft SIM card acquisition request to the server; receiving seed soft SIM card information which corresponds to the seed soft SIM card acquisition request and is returned by the server, and establishing a second mobile network to enable the first terminal device to be in communication connection with the server; transmitting a cloud SIM card acquisition request to the server; and receiving cloud SIM card information which corresponds to the cloud SIM card acquisition request and is returned by the server, and establishing a third mobile network to enable the first terminal device to be connected to the network through the third mobile network.

9 Claims, 5 Drawing Sheets

METHOD OF CONNECTING A TERMINAL DEVICE TO NETWORK, A TERMINAL DEVICE AND A NON-TRANSITORY COMPUTER READABLE STORAGE MEDIUM

CROSS-REFERENCE TO RELATED APPLICATION

The present application is a Continuation-in-Part of PCT Patent Application Ser. No. PCT/CN2019/078669, filed on Mar. 19, 2019, which claims priority to Chinese Patent Application Ser. No. CN201810448291.9, filed on May 11, 2018, the entire disclosures of which are incorporated herein by reference in their entireties.

TECHNICAL FIELD

The present disclosure relates to the technical field of wireless communication, and particularly relates a method of connecting terminal device to network, a terminal device, and a non-transitory computer readable storage medium.

BACKGROUND

With the development of technology, more and more communication devices may implement a cardless networking function. Generally, a seed card may be acquired from a server when a communication device is connected with a wireless network, then, authentication is performed using the seed card, and a cloud SIM card is acquired, and surfing the Internet is realized through the cloud SIM card. However, there is a problem, that is, the communication device may not acquire the seed card from the server without the wireless network, thus, the cloud SIM card may not be acquired, and Internet surfing may not be finally realized.

In order to solve the technical problem mentioned above, a technical solution is adopted in the prior art, which is described as follows: a resident seed hard card is previously arranged in the communication device, when the user needs to surf the Internet, the resident seed hard card previously arranged in the communication device is used to establish communication with the server, then, the cloud SIM card is acquired from the server and is downloaded locally, and then, Internet surfing is realized. However, there is a problem that a resident seed hard card needs to be permanently resident in the communication device of the user, whether the resident seed hard card or the communication device is used to surf the Internet by the user, the hard card needs to be ensured to be always permanently available, that is, the seed hard card needs to be paid permanently.

It can be seen that, the network connection method in the prior art has the disadvantages that the resident seed hard card needs to be permanently paid, which causes the cost of Internet surfing of the user to be high.

SUMMARY

Embodiments of the present disclosure provide a network connection method, which aims at solving a problem that the resident seed hard card needs to be paid permanently, which causes the cost of Internet surfing of the user to be high.

Embodiments of the present disclosure are implemented by providing a network connection method being applied in a first terminal device, including:

establishing, by the first terminal device, a first mobile network through one activation soft SIM card in at least one activation soft SIM card previously arranged in a first terminal device to enable the first terminal device to be in communication connection with a server through the first mobile network, in response to receiving a network connection request;

where the activation soft SIM card is a soft SIM card shared by the first terminal device and at least one second terminal device;

transmitting, by the first terminal device, a seed soft SIM card acquisition request to the server, where the seed soft SIM card acquisition request comprises current country identification information and identification information of the first terminal device;

receiving seed soft SIM card information which corresponds to the seed soft SIM card acquisition request and is returned by the server, and establishing a second mobile network through the seed soft SIM card by the first terminal device, in order that the first terminal device is enabled to be in communication connection with the server through the second mobile network;

transmitting a cloud SIM card acquisition request to the server by the first terminal device, where the cloud SIM card acquisition request comprises the current country identification information and identification information of the first terminal device; and receiving cloud SIM card information which corresponds to the cloud SIM card acquisition request and is returned by the server and establishing a third mobile network through the cloud SIM card by the first terminal device in order that the first terminal device is enabled to be connected to the network through the third mobile network.

The embodiments of the present disclosure further provide a terminal device, including a processor, the processor is configured to, when executing a computer program stored in a memory, implement steps in the network connection method as mentioned above.

The embodiments of the present disclosure further provide a computer readable storage medium which stores a computer program, when the computer program is executed by a processor, steps in the aforesaid network connection method are implemented.

In the network connection method provided by the embodiments of the present disclosure, the first mobile network is established through one activation soft SIM card in at least one activation soft SIM card previously arranged in the first terminal device in response to a network connection request, so that the first terminal device is enabled to communicate with the server through the first mobile network; the seed soft SIM card acquisition request including the current country identification information and identification information of the first terminal device is transmitted to the server, the seed soft SIM card information which corresponds to the seed soft SIM card acquisition request and is returned by the server is received, the second mobile network is established, and the communication connection between the first terminal device and the server is realized through the second mobile network; finally, the cloud SIM card acquisition request including the current country identification information and identification information of the first terminal device is transmitted to the server firstly, and the cloud SIM card information which corresponds to the cloud SIM card acquisition request and is returned by the server is received, and the third mobile network is established through the cloud SIM card, so that the first terminal device is enabled to be connected to the network through the third mobile network. The user may surf the Internet without the need of purchasing a physical card; moreover, one activation soft SIM card may be shared by multiple communication devices, not only the cost of Internet surfing of the user is reduced, the activation soft SIM card may also be utilized effectively, and a waste of resources of activation soft SIM card is avoided.

BRIEF DESCRIPTION OF THE DRAWINGS

For a more complete understanding of the present disclosure, reference should now be made to the embodiments illustrated in greater detail in the accompanying drawings and described below by way of examples of the present disclosure.

DESCRIPTION OF THE EMBODIMENTS

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

In the network connection method provided by the embodiment of the present disclosure, when a network connection request initiated by a user is received, a first mobile network is established through at least one activation soft SIM card previously arranged in the first terminal device which may be shared by a plurality of terminal devices; a seed soft SIM card is acquired through a seed soft SIM card acquisition request including the current country identification information and identification information of the first terminal device, and a second mobile network is established; finally, the cloud SIM card is acquired through the cloud SIM card acquisition request, and a third mobile network is established, a function that the communication device is connected to the Internet without physical card is realized, moreover, one activation soft SIM card may be shared by a plurality of communication devices, not only the cost of Internet surfing of the user is reduced, the activation soft SIM card may also be effectively utilized, and the waste of resources of activation soft SIM cards is avoided.

Figure 1:
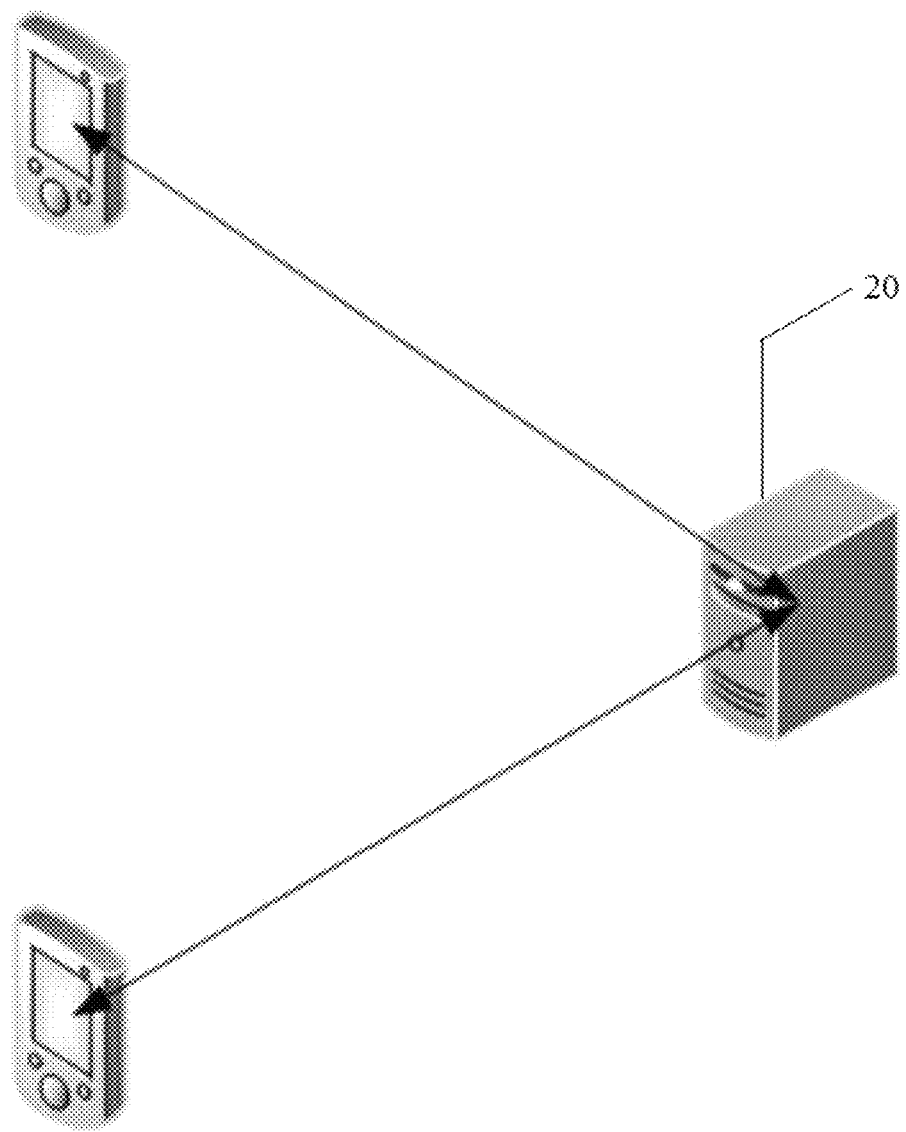
FIG. 1 is a block diagram of a network architecture diagram of a network connection method provided by an embodiment of the present disclosure.

FIG. 1 illustrates a network architecture diagram of a network connection method provided by an embodiment of the present disclosure, this network connection method is realized by at least one communication device and a server 20.

In this embodiment of the present disclosure, the communication device includes but is not limited to a smart terminal device such as a mobile phone, a tablet computer, a palm computer, a notebook computer, a desktop computer, a smart television, and the like, the communication device is not specifically limited herein.

In this embodiment of the present disclosure, the at least one communication device may be connected with the server 20 through a wireless network or a mobile network, the wireless network includes but is not limited to such as Wi-Fi (Wireless Fidelity), Bluetooth connection, and the like; the mobile network connection includes but is not limited to such as GSM (Global System for Mobile Communications), CDMA (Code Division Multiple Access), and the like.

Figure 2:
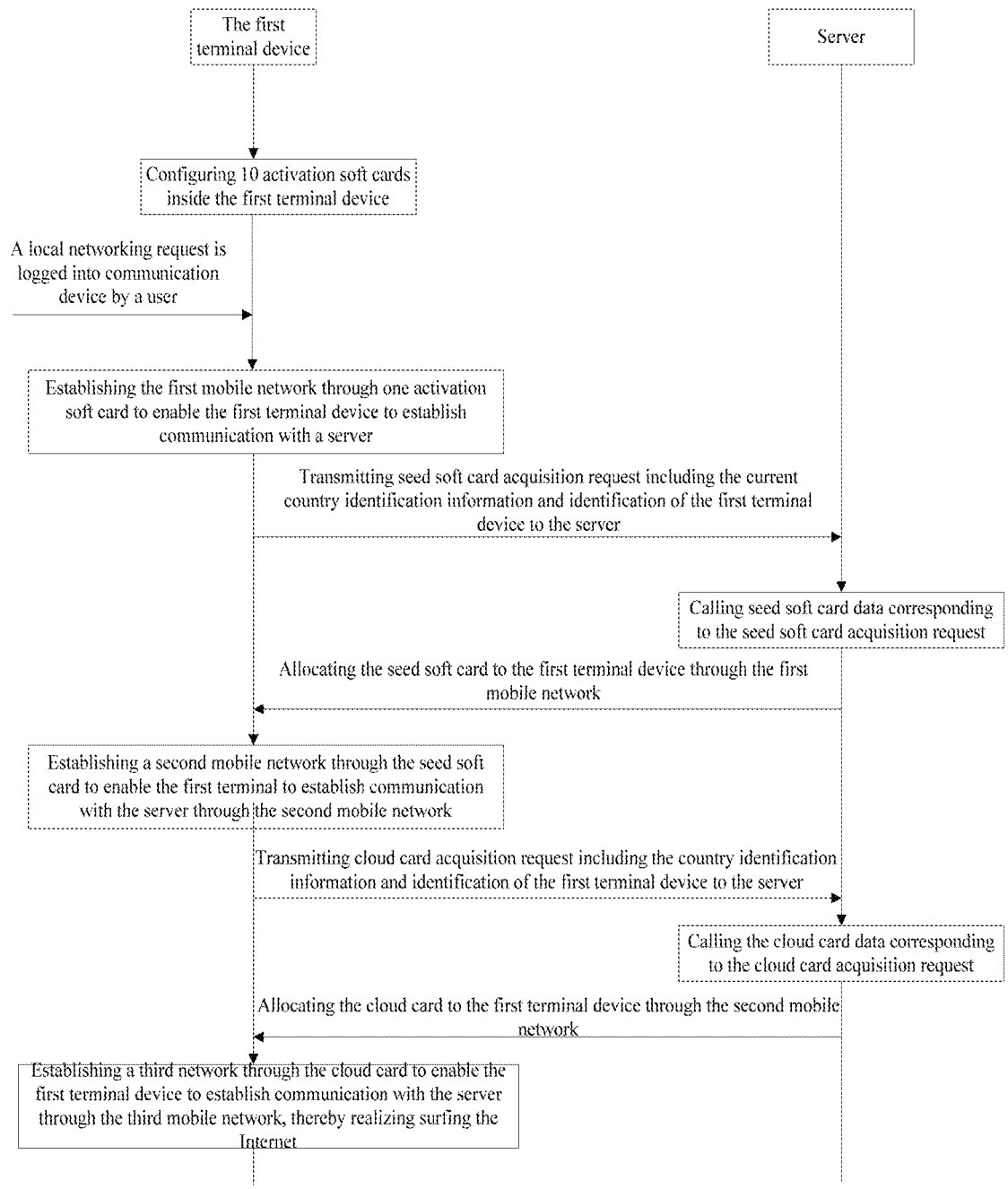
FIG. 2 is an interactive diagram of a network connection method provided by an embodiment of the present disclosure.
Figure 3:
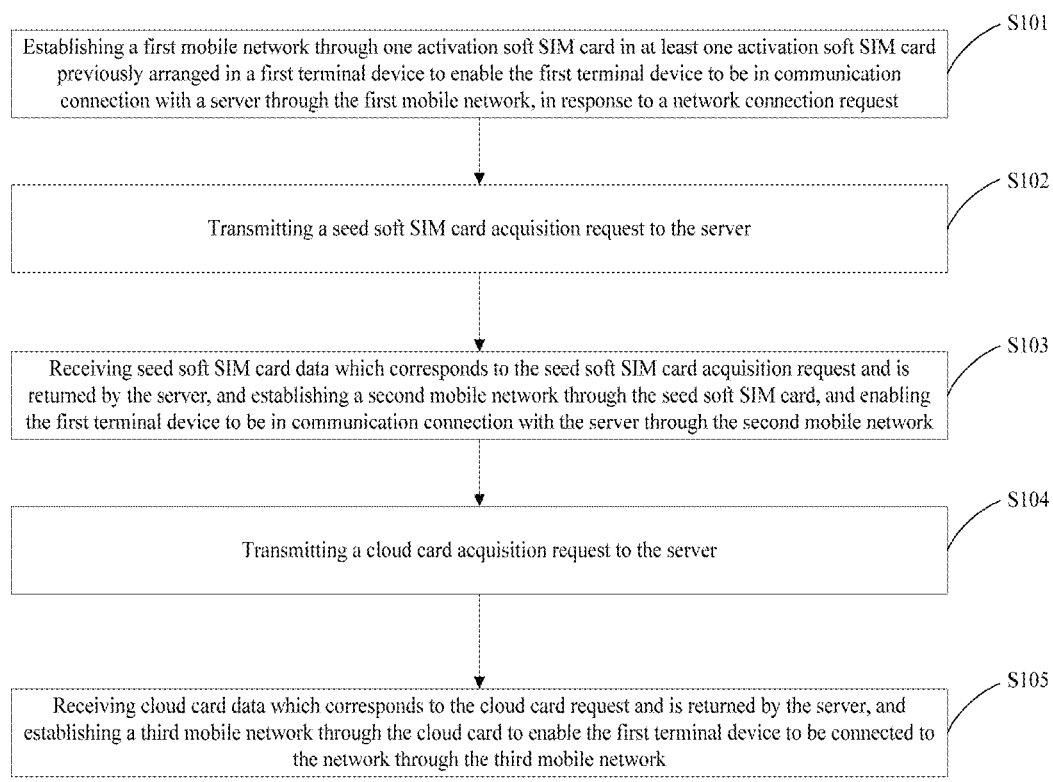
FIG. 3 is a implementation schematic diagram of one network connection method provided by an embodiment of the present disclosure.

FIG. 2 illustrates an interaction diagram of a network connection method according to an embodiment of the present disclosure, FIG. 3 illustrates an implementation flow diagram of a network connection method according to an embodiment of the present disclosure, the network connection method is described in detail below with reference to FIG. 2 and FIG. 3.

The network connection method is applied to the first terminal device and includes:

at step 101, establishing, by the first terminal device, a first mobile network through an activation soft SIM card in at least one activation soft SIM card previously arranged in the first terminal device in order that the first terminal device is enabled to be in communication connection with the server 20 through the first mobile network, in response to receiving the network connection request.

The activation soft SIM card is a soft SIM card shared by the first terminal device and at least one second terminal device.

In this embodiment of the present disclosure, the network connection request may be sent by the user through the first terminal device, the network connection request may be a request initiated by the user directly by setting the network connection, and may also be initiated by the user by using an application program. For example, the network connection request may be initiated by the user by directly setting the network in a network setting interface of a mobile phone, and may also be initiated by logging an application program such as WeChat, QQ, baidu, etc., the network connection request is not specifically limited herein.

In this embodiment of the present disclosure, the first terminal device includes but is not limited to a mobile terminal device such as a mobile phone, a smart phone, a notebook computer, a digital broadcast receiver, a PDA (Personal Digital Assistant), a tablet computer, a PMP (Portable multimedia Player), a navigation device, etc., and is not limited to a fixed terminal device such as a digital TV, a desktop computer, and the like. The smart terminal is assumed to be a mobile smart terminal hereinafter.

As one embodiment of the present disclosure, there may be one or more than one activation soft SIM cards. The activation soft SIM card includes an IMSI (International Mobile Subscriber Identification Number), a KI (Key Identifier), an ICCID (Integral Circuit Card Identity), etc., and the activation soft SIM card has ciphering key computing function.

In this embodiment of the present disclosure, the first terminal includes but is not limited to a mobile terminal such as a mobile phone, a smart phone, a notebook computer, a digital broadcast receiver, a PDA (Personal Digital Assistant), a tablet computer, a PMP (Portable Multimedia Player), a navigation device, etc., and is not limited to a fixed terminal such as a digital TV, a desktop computer, or the like. Below, the intelligent terminal is assumed to be a mobile intelligent terminal; it should be understood that, there is no difference between the first terminal device and the second terminal device essentially, the first terminal device and the second terminal device are merely used for representing two different terminal devices, that is, the activation soft SIM card has the function of being shared by a plurality of mobile intelligent terminal devices.

As a practical application of the present disclosure, the ratio of the activation soft SIM card to the mobile smart terminal may be 1:10, 1:20, 1:50, 1:100, 1:300, 1:500, 1:1000, or the like, which is convenient for one activation soft SIM card to be shared by a plurality of mobile intelligent terminals, an utilization rate of the activation soft SIM card is effectively improved; moreover, the first mobile network enabled by the activation soft SIM card consumes less traffic, and the cost of Internet surfing of the user is saved.

In this embodiment of the present disclosure, the activation soft SIM card has an Internet surfing function, so that the first mobile network includes but is not limited to GPRS (General Packet Radio Service), GSM (Global System for Mobile Communication), particularly, the first mobile network is determined by the network accessed by the activation soft SIM card.

As a preferable embodiment of the present disclosure, the first terminal device includes a terminal device that supports performing networking through at least the soft SIM card and the cloud SIM card, the terminal device may be such as a mobile phone having dual card dual standby function.

At step 102, transmitting a seed soft SIM card acquisition request to the server 20 by the first terminal device, where the seed soft SIM card acquisition request includes current country identification information and identification information of the first terminal.

In this embodiment of the present disclosure, the current country identification information of the first terminal device is used as a unique identifier for identifying the country where the first terminal device is located; the identification information of the first terminal device is used as the unique identifier for identifying the level of the first terminal device.

In this embodiment of the present disclosure, there may be one or a plurality of seed soft SIM cards, the number of seed soft SIM cards is determined according to the country where the first terminal of the user is located and the level of the first terminal device of the user. For example, three seed soft SIM cards are required to cover three states of Indonesia when the user is in Indonesia.

As one embodiment of the present disclosure, the seed soft SIM card has an Internet surfing function and a ciphering key computing function, so that the first mobile network includes but is not limited to GPRS (General Packet Radio Service), GSM (Global System for Mobile Communication), the first mobile network is specifically determined according to the network accessed by the seed soft SIM card.

At step 103, receiving seed soft SIM card information which corresponds to the seed soft SIM card acquisition request and is returned by the server and establishing a second mobile network through the seed soft SIM card by the first terminal device in order that the first terminal device is enabled to be in communication connection with the server 20 through the second mobile network.

In this embodiment of the present disclosure, the seed soft SIM card information includes an IMSI (International Mobile Subscriber Identification Number), a KI (Key Identifier), an ICCID (Integral Circuit Card Identity), etc., and the seed soft SIM card has ciphering key computing function.

In this embodiment of the present disclosure, the seed soft SIM card has the function of surfing the Internet, thus, the second mobile network includes but is not limited to a GPRS (General Packet Radio Service), GSM (Global System for Mobile Communication), and the second mobile network is specifically determined by the network accessed by the seed soft SIM card.

At step 104, transmitting a cloud SIM card acquisition request to the server 20 by the first terminal device, where the cloud SIM card acquisition request includes current country identification information and identification information of the first terminal.

At step 105, receiving cloud SIM card information which corresponds to the cloud SIM card request and is returned by the server and establishing a third mobile network through the cloud SIM card by the first terminal device in order that the first terminal device is enabled to be connected to the network through the third mobile network.

In this embodiment of the present disclosure, the cloud SIM card generally refers to a mobile service prepaid card which is put forward by a network carrier, the first terminal device performs authentication through the cloud SIM card, Internet surfing may be realized after authentication is successful.

In this embodiment of the present disclosure, the third mobile network includes but is not limited to GPRS (General Packet Radio Service), GSM (Global System for Mobile Communications), thus, the mobile terminal device is connected to the network through the third mobile network, thereby realizing surfing the Internet by roaming without plugging in a SIM card.

It may be understood that, in this embodiment of the present disclosure, in order to ensure the stability of the cloud SIM card, the stability of the seed soft SIM card also needs to be guaranteed, so that the second mobile network and the third mobile network are always in an enabled state.

In the network connection method provided by the embodiments of the present disclosure, the first mobile network is established through one activation soft SIM card in at least one activation soft SIM card previously arranged in the first terminal device in response to a network connection request, so that the first terminal device is enabled to communicate with the server through the first mobile network; the seed soft SIM card acquisition request including the current country identification information and identification information of the first terminal device is transmitted to the server, the seed soft SIM card information which corresponds to the seed soft SIM card acquisition request and is returned by the server is received, the second mobile network is established, and the communication connection between the first terminal device and the server is realized through the second mobile network; finally, the cloud SIM card acquisition request including the current country identification information and identification information of the first terminal device is transmitted to the server firstly, and the cloud SIM card information which corresponds to the cloud SIM card acquisition request and is returned by the server is received, and the third mobile network is established through the cloud SIM card, so that the first terminal device is enabled to be connected to the network through the third mobile network. The user may surf the Internet without the need of purchasing a physical card; moreover, one activation soft SIM card may be shared by multiple communication devices, not only the cost of Internet surfing of the user is reduced, the activation soft SIM card may also be utilized effectively, and a waste of resources of activation soft SIM card is avoided.

In this embodiment of the present disclosure, the step 101 includes:

determining, by the first terminal device, whether the first terminal is in a non-networked state in response to receiving the network connection request; and establishing a first mobile network through one activation soft SIM card in at least one activation soft SIM card previously arranged in the first terminal by the first terminal device, when the first terminal is determined as being in the non-networked state.

In this embodiment of the present disclosure, a condition that the first terminal is in the non-networked state includes the first terminal device may not surf the Internet through a wired network and a wireless network. The wired network and the wireless network are described in FIG. 1, it is not be repeatedly described herein.

In this embodiment of the present disclosure, the first mobile network is established through one activation soft SIM card in at least one activation soft SIM card previously arranged in the first terminal when the first terminal is determined as being in the non-networked state, so that the first mobile network may still be established through the activation soft SIM card under the condition that the first terminal fails to connect to any network and in the absence of physical card, and Internet surfing is finally realized.

Figure 4:
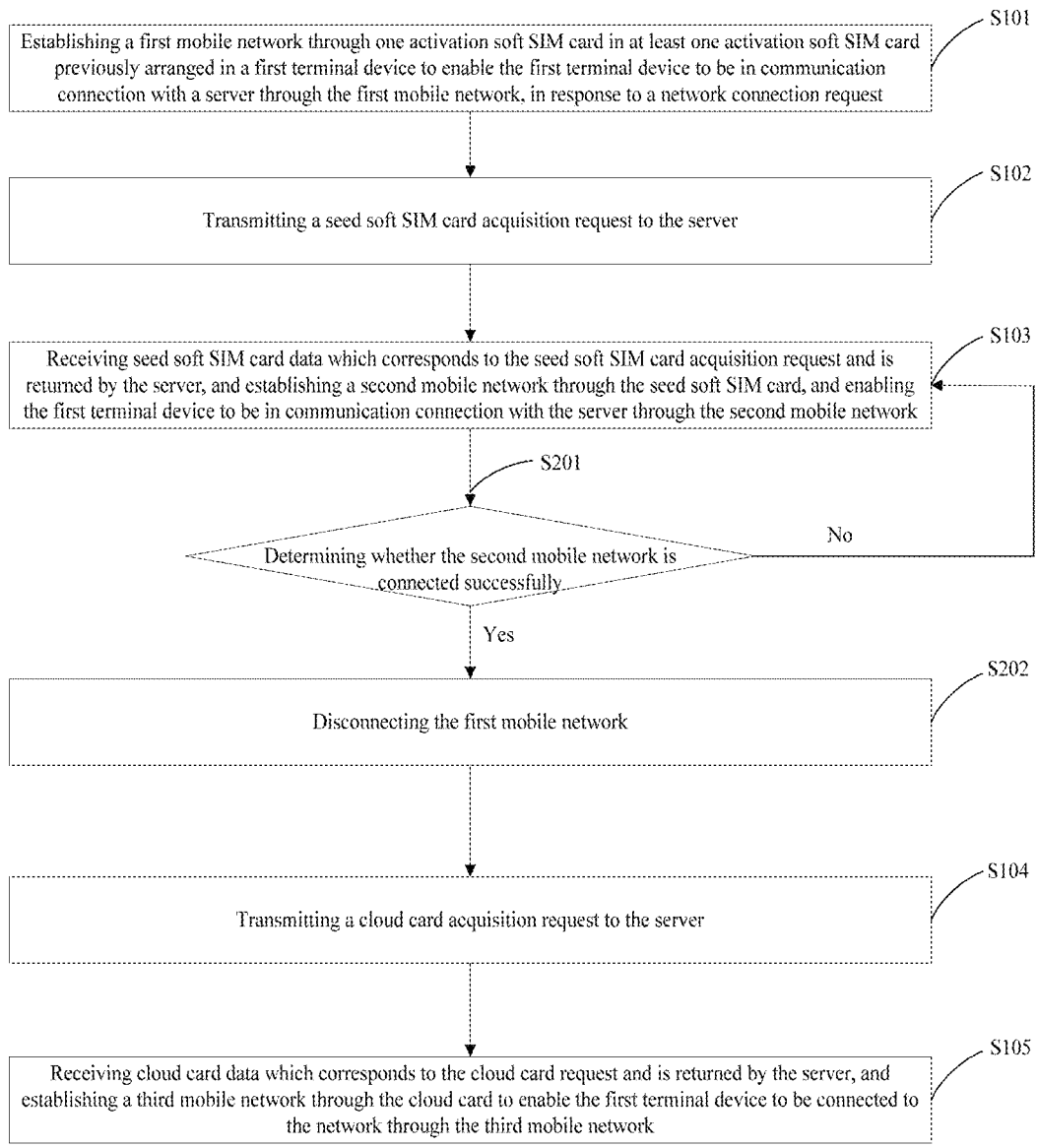
FIG. 4 is an implementation schematic diagram of another network connection method provided by an embodiment of the present disclosure.

FIG. 4 illustrates an implementation flow diagram of another network connection method according to an embodiment of the present disclosure, which differs from the network connection method shown in FIG. 3 in that the network connection method further includes:

determining whether the terminal device is connected in communication with the server 20 through the second mobile network successfully by the first terminal device; and disconnecting the first mobile network, when the first terminal device is determined as being connected with the server 20 through the second mobile network successfully.

It may be understood that, when the second mobile network enabled by the seed soft SIM card is connected successfully, the first network enabled by the activation soft SIM card is disabled, such that the waste of resource of activation soft SIM cards may be effectively prevented, service is provided for other terminal devices which shares the activation soft SIM cards, and the activation soft SIM card is shared by a plurality of terminal devices.

In this embodiment of the present disclosure, the step 101 includes:

determining, by the first terminal device, whether the number of times of network connection requests in a preset time range exceeds a preset network connection times threshold, in response to receiving the network connection request.

In this embodiment of the present disclosure, the preset time range may be 1 minute, 2 minutes, 5 minutes, 20 minutes, 1 hour, etc., which is not specifically limited.

In this embodiment of the present disclosure, the predetermined network connection times threshold may be 2, 3, 5, 10, 20, etc., which is not specifically limited.

The first mobile network is prohibited from being established through one activation soft SIM card in at least one activation soft SIM card previously arranged in the first terminal device, if the number of times of network connection requests in a preset time range is determined as exceeding the preset network connection times threshold.

For example, if the user enables the activation soft SIM card three times within 1 minute, the user may be prohibited from enabling the activation soft SIM card again; as an alternative, the user may be informed of being prohibited from enabling the activation soft SIM card through the words in the user interface of the mobile phone.

For example, the user may be prohibited from enabling the activation soft SIM card again if the user of the mobile phone enables the activation soft SIM card 10 times in 5 minutes.

According to the network connection method provided by the embodiment of the present disclosure, when the number of times of network connection requests in the preset time range is determined as exceeding the preset network connection times threshold, the first mobile network is prohibited from being established through one activation soft SIM card in at least one activation soft SIM card previously arranged in the first terminal, in this way, a malicious user may be effectively prevented from repeatedly enabling the activation soft SIM card for many times, such that the activation soft SIM card resources is avoided from being occupied maliciously.

In the network connection method provided by the embodiments of the present disclosure, the first mobile network is established through one activation soft SIM card in at least one activation soft SIM card previously arranged in the first terminal device in response to a network connection request, so that the first terminal device is enabled to communicate with the server through the first mobile network; the seed soft SIM card acquisition request including the current country identification information and identification information of the first terminal device is transmitted to the server, the seed soft SIM card information which corresponds to the seed soft SIM card acquisition request and is returned by the server is received, the second mobile network is established, and the communication connection between the first terminal device and the server is realized through the second mobile network; finally, the cloud SIM card acquisition request including the current country identification information and identification information of the first terminal device is transmitted to the server firstly, and the cloud SIM card information which corresponds to the cloud SIM card acquisition request and is returned by the server is received, and the third mobile network is established through the cloud SIM card, so that the first terminal device is enabled to be connected to the network through the third mobile network. The user may surf the Internet without the need of purchasing a physical card; moreover, one activation soft SIM card may be shared by multiple communication devices, not only the cost of Internet surfing of the user is reduced, the activation soft SIM card may also be utilized effectively, and a waste of resources of activation soft SIM card is avoided.

Figure 5:
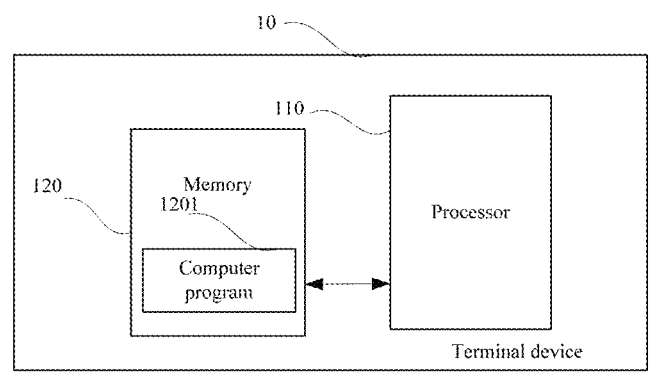
FIG. 5 illustrates a schematic structural diagram of a terminal device provided by an embodiment of the present disclosure.

Embodiments of the present disclosure further provide a terminal device 10, as shown in FIG. 5, the terminal device 10 includes a processor 110, a memory 120 and computer program 1201 stored in the memory 120 and executable by the processor 110, when executing the computer program 1201 stored in the memory 120, the processor 110 is configured to implement steps of:

establishing a first mobile network through one activation soft SIM card in at least one activation soft SIM card previously arranged in a first terminal device to enable the first terminal device to be in communication connection with a server 20 through the first mobile network, in response to receiving a network connection request; where the activation soft SIM card is a soft SIM card shared by the first terminal device and at least one second terminal;

transmitting a seed soft SIM card acquisition request to the server 20, where the seed soft SIM card acquisition request includes current country identification information and identification information of the first terminal;

receiving seed soft SIM card information which corresponds to the seed soft SIM card acquisition request and is returned by the server 20, and establishing a second mobile network through the seed soft SIM card to enable the first terminal device to be in communication connection with the server 20 through the second mobile network;

transmitting a cloud SIM card acquisition request to the server 20, where the cloud SIM card acquisition request includes the current country identification information and identification information of the first terminal device; and receiving cloud SIM card information which corresponds to the cloud SIM card acquisition request and is returned by the server 20 and establishing a third mobile network through the cloud SIM card to enable the first terminal device to be connected to the network through the third mobile network.

In a preferable embodiment, the processor 110 is particularly configured to implement the step of establishing a first mobile network through one activation soft SIM card in at least one activation soft SIM card previously arranged in a first terminal device in response to receiving a network connection request by determining whether the first terminal device is in a non-networked state; and establishing the first mobile network through one activation soft SIM card in the at least one activation soft SIM card previously arranged in the first terminal device in response to receiving the network connection request, when the first terminal device is determined as being in the non-networked state.

In a preferable embodiment, when executing the computer program 1201 stored in the memory 120, the processor 110 is further configured to implement: determining whether the first terminal device is connected in communication with the server through the second mobile network successfully; and disconnecting the first mobile network when the terminal device is determined as being connected in communication with the server through the second mobile network successfully.

In a preferable embodiment, the processor 110 is particularly configured to implement the step of establishing a first mobile network through one activation soft SIM card in at least one activation soft SIM card previously arranged in a first terminal device in response to receiving a network connection request by determining whether the number of times of network connection requests in a preset time range exceeds a preset network connection times threshold in response to receiving the network connection request; and prohibiting the first mobile network from being established through one activation soft SIM card in the at least one activation soft SIM card previously arranged in the first terminal device, if the number of times of network connection requests in the preset time range exceeds the preset network connection times threshold.

Exemplarily, the computer program 1201 may be divided into one or a plurality of modules, the one or plurality of modules are stored in the memory 120 and is executed by the processor 110 so as to implement the present disclosure. The one or plurality of modules may be a series of computer program instruction segments that may accomplish particular functionalities, these instruction segments are used for describing an executive process of the computer program 1201 in the terminal device 10. For example, the computer program 1201 may be divided into the steps in the network connection method provided by the various method embodiments as mentioned above.

It may be understood for the person of ordinary skill in the art that, the description of the terminal device 10 is merely an example and should not be regarded as the limitation to the terminal device 10, more or less components than the description of the terminal device 10 may be included, or some components or different components may be combined, for example, an input and output device, a network access device, a bus, and the like may be included.

The so called processor 110 may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor may also be any conventional processor and the like. The processor is the control center of the computer device, and utilizes various interfaces and circuits to connect to all parts of the computer device.

The memory 120 may be used to store the computer programs and/or modules, the processor implements various functions of the computer device by performing or executing computer programs and/or modules stored in the memory and calling data stored in the memory 120. The memory 120 may mainly include a program storage area and a data storage area, where the storage program region may store an operating system and at least one function desired application such as a sound playing function, an image playing function, etc.; the data storage area may store data (such as audio data, phone book, etc.) created according to the use of mobile phone, etc. Furthermore, the memory 120 may include high-speed RAM (Random Access Memory), and may also include non-volatile memory, such as a hard disk, an internal storage, a plug-in hard disk, a smart memory card (SMC), a secure digital (SD) card, a flash card, at least one magnetic disk storage device, a flash memory device, or other volatile solid-state storage device.

If the modules or units integrated in the terminal device 10 are achieved in the form of software functional units and are sold or used as an independent product, they may be stored in a computer readable storage medium. Based on this understanding, a whole or part of flow process of implementing the method in the aforesaid embodiments of the present disclosure may also be accomplished by using computer program to instruct relevant hardware. The computer program 1201 is stored in a computer readable storage medium, when the computer program 1201 is executed by the processor 110, the steps in the various embodiments of the various network connection method described above may be implemented. Where, the computer program 1201 includes computer program codes, which may be in the form of source code, object code, executable documents or some intermediate form, etc. The computer readable medium may include: recording medium, USB flash disk, mobile hard disk, hard disk, optical disk, computer storage device, ROM (Read-Only Memory), RAM (Random Access Memory).

The aforementioned embodiments are only preferable embodiments of the present disclosure, and should not be regarded as limitation to the present disclosure. Any modification, equivalent replacement, improvement, and the like, which are made within the spirit and the principle of the present disclosure, should all be included in the protection scope of the present disclosure.

What is claimed is:

1. A network connection method being applied in a first terminal device, comprising:

establishing, by the first terminal device, a first mobile network through one activation soft SIM card in at least one activation soft SIM card previously arranged in the first terminal device to enable the first terminal device to be in communication connection with a server through the first mobile network, in response to receiving a network connection request;
wherein the activation soft SIM card is a soft SIM card shared by the first terminal device and at least one second terminal device;
transmitting a seed soft SIM card acquisition request to the server by the first terminal device, wherein the seed soft SIM card acquisition request comprises current country identification information and identification information of the first terminal;
receiving seed soft SIM card information which corresponds to the seed soft SIM card acquisition request and is returned by the server and establishing a second mobile network through the seed soft SIM card by the first terminal device in order that the first terminal device is enabled to be in communication connection with the server through the second mobile network;
transmitting a cloud SIM card acquisition request to the server, wherein the cloud SIM card acquisition request comprises the current country identification information and identification information of the first terminal device; and
receiving cloud SIM card information which corresponds to the cloud SIM card acquisition request and is returned by the server, and establishing a third mobile network through the cloud SIM card by the first terminal device in order that the first terminal device is enabled to be connected to the network through the third mobile network.

2. The network connection method according to claim 1, wherein the step of establishing, by the first terminal device, a first mobile network through one activation soft SIM card in at least one activation soft SIM card previously arranged in a first terminal device in response to receiving a network connection request comprises:
determining whether the first terminal device is in a non-networked state in response to receiving the network connection request; and
establishing, by the first terminal device, the first mobile network through one activation soft SIM card in the at least one activation soft SIM card previously arranged in the first terminal device, when the first terminal device is determined as being in the non-networked state.

3. The network connection method according to claim 1, further comprising:
determining whether the first terminal device is connected in communication with the second mobile network through the second mobile network successfully by the first terminal device; and
disconnecting the first mobile network by the first terminal device when the first terminal device is determined as being connected in communication with the server through the second mobile network successfully.

4. The network connection method according to claim 1, wherein the step of establishing, by the first terminal device, a first mobile network through one activation soft SIM card in at least one activation soft SIM card previously arranged in a first terminal in response to receiving a network connection request comprises:
determining, by the first terminal device, whether the number of times of network connection requests in a preset time range exceeds a preset network connection times threshold in response to receiving the network connection request; and prohibiting, by the first terminal device, the first mobile network from being established through one activation soft SIM card in the at least one activation soft SIM card previously arranged in the first terminal device, and selecting, by the terminal device, another activation soft SIM card from the at least one activation soft SIM card previously arranged in the first terminal device to establish the first mobile network, if the number of times of network connection requests in the preset time range exceeds the preset network connection times threshold.

5. A terminal device, comprising: a processor, a memory and computer program stored in the memory and executable by the processor, wherein the processor is configured to, when executing the computer program stored in the memory, implement steps of:
establishing a first mobile network through one activation soft SIM card in at least one activation soft SIM card previously arranged in a first terminal device to enable the first terminal device to be in communication connection with a server through the first mobile network, in response to receiving a network connection request;
wherein the activation soft SIM card is a soft SIM card shared by the first terminal device and at least one second terminal;
transmitting a seed soft SIM card acquisition request to the server, wherein the seed soft SIM card acquisition request comprises current country identification information and identification information of the first terminal;
receiving seed soft SIM card information which corresponds to the seed soft SIM card acquisition request and is returned by the server, and establishing a second mobile network through the seed soft SIM card to enable the first terminal device to be in communication connection with the server through the second mobile network;
transmitting a cloud SIM card acquisition request to the server, wherein the cloud SIM card acquisition request comprises the current country identification information and identification information of the first terminal device; and
receiving cloud SIM card information which corresponds to the cloud SIM card acquisition request and is returned by the server, and establishing a third mobile network through the cloud SIM card to enable the first terminal device to be connected to the network through the third mobile network.

6. A non-transitory computer readable storage medium which stores computer program or computer instruction, wherein when the computer program or computer instruction is executed by a processor, steps in the network connection method according to claim 1 are implemented.

7. The terminal device according to claim 5, wherein the processor is particularly configured to implement the step of establishing a first mobile network through one activation soft SIM card in at least one activation soft SIM card previously arranged in a first terminal device in response to receiving a network connection request by:
determining whether the first terminal device is in a non-networked state in response to receiving the network connection request; and
establishing the first mobile network through one activation soft SIM card in the at least one activation soft SIM card previously arranged in the first terminal device, when the first terminal device is determined as being in the non-networked state.

8. The terminal device according to claim 5, wherein when executing the computer program stored in the memory, the processor is further configured to implement:
- determining whether the first terminal is connected in communication with the server through the second mobile network successfully; and
- disconnecting the first mobile network when the first terminal is determined as being connected in communication with the server through the second mobile network successfully.

9. The terminal device according to claim 5, wherein the processor is particularly configured to implement the step of establishing a first mobile network through one activation soft SIM card in at least one activation soft SIM card previously arranged in a first terminal device in response to a network connection request by determining whether the number of times of network connection requests in a preset time range exceeds a preset network connection times threshold in response to the network connection request; and prohibiting the first mobile network from being established through one activation soft SIM card in the at least one activation soft SIM card previously arranged in the first terminal device, if the number of times of network connection requests in the preset time range exceeds the preset network connection times threshold.

\* \* \* \* \*